(12) United States Patent
Osaka et al.

(10) Patent No.: US 7,257,725 B2
(45) Date of Patent: Aug. 14, 2007

(54) MEMORY SYSTEM

(75) Inventors: Hideki Osaka, Kawasaki (JP);
Toyohiko Komatsu, Kawasaki (JP);
Masashi Horiguchi, Kodaira (JP);
Susumu Hatano, Kodaira (JP); Kazuya Ito, Kodaira (JP)

(73) Assignee: Elpida Memory, Inc., Tokyo (JP)

( * ) Notice: Subject to any disclaimer, the term of this patent is extended or adjusted under 35 U.S.C. 154(b) by 848 days.

(21) Appl. No.: 10/294,594

(22) Filed: Nov. 15, 2002

(65) Prior Publication Data
US 2003/0200407 A1 Oct. 23, 2003

Related U.S. Application Data

(63) Continuation of application No. PCT/JP00/08796, filed on Dec. 13, 2000.

(30) Foreign Application Priority Data
May 18, 2000 (JP) .............................. 2000-152667

(51) Int. Cl.
*G06F 1/00* (2006.01)
(52) U.S. Cl. ...................... 713/500; 711/167; 365/233
(58) Field of Classification Search ................ 713/500; 711/167; 365/233
See application file for complete search history.

(56) References Cited

U.S. PATENT DOCUMENTS

| | | | |
|---|---|---|---|
| 3,786,418 A * | 1/1974 | Nick | 375/257 |
| 5,638,402 A | 6/1997 | Osaka et al. | |
| 5,646,904 A * | 7/1997 | Ohno et al. | 365/233 |
| 5,663,661 A * | 9/1997 | Dillon et al. | 326/30 |
| 5,805,030 A * | 9/1998 | Dhuey et al. | 333/1 |
| 5,867,432 A * | 2/1999 | Toda | 365/194 |
| 5,987,576 A * | 11/1999 | Johnson et al. | 711/167 |
| 6,075,393 A | 6/2000 | Tomita et al. | |

(Continued)

FOREIGN PATENT DOCUMENTS

JP 64-68672 3/1989

(Continued)

OTHER PUBLICATIONS

"Ramlink" SyncLink Proposal for IEEE P1596.4, H. Wiggers, Mar. 23, 1995, Hewlett Packard, pp. 1-20.

(Continued)

*Primary Examiner*—Chun Cao
*Assistant Examiner*—Vincent Tran
(74) *Attorney, Agent, or Firm*—Antonelli, Terry, Stout & Kraus, LLP.

(57) ABSTRACT

A clock is located at a position close to a plurality of memory modules connected to a memory controller and located away from the controller, and wiring is carried out so that read access is preferential for transmission of read data. With respect to write data, a delay amount corresponding to a round-trip propagation delay time to each of the modules is measured and writing of the write data is carried out while maintaining a known time relationship between the clock and data. To measure round-trip reflection, lines are wired between the modules and a location detection circuit in a 1:1 relationship, and the circuit measures a time taken from a signal output time of a driver having the same impedance as that of the wired lines to a reflected-wave reception time of a hysteresis receiver.

7 Claims, 17 Drawing Sheets

U.S. PATENT DOCUMENTS

| | | | | |
|---|---|---|---|---|
| 6,111,812 A | * | 8/2000 | Gans et al. | 365/233 |
| 6,115,318 A | * | 9/2000 | Keeth | 365/233 |
| 6,125,419 A | * | 9/2000 | Umemura et al. | 710/110 |
| 6,154,821 A | * | 11/2000 | Barth et al. | 711/170 |
| 6,600,790 B1 | | 7/2003 | Umemura et al. | |

FOREIGN PATENT DOCUMENTS

| | | |
|---|---|---|
| JP | 7-73118 | 3/1995 |
| JP | 7-141079 | 6/1995 |
| JP | A-H7-141079 | 6/1995 |
| JP | 8-123717 | 5/1996 |
| JP | A-H8-123717 | 5/1996 |
| JP | 10-112182 | 4/1998 |
| JP | 10-133794 | 5/1998 |
| JP | A-H10-133794 | 5/1998 |
| JP | 10-224204 | 8/1998 |
| JP | 11-39869 | 2/1999 |
| JP | A-H11-39869 | 2/1999 |
| JP | 11-85612 | 3/1999 |
| WO | WO99/48260 | 9/1999 |

OTHER PUBLICATIONS

"High Performance Memories" New Architecture DRAMs and SRAMs—evolution and function, B. Prince, John Wiley & Sons, pp. 204-208.

* cited by examiner

PRINCIPLE OF CIRCUIT OF FIG.2

FIG.12

MAP OF DELAY REGISTER 71

| ADDRESS | DELAY STAGE NUMBER |
|---|---|
| MODULE 0 | MOD[-i(0),j] |
| MODULE 1 | MOD[-i(1),j] |
| MODULE 2 | MOD[-i(2),j] |
| . | . |
| . | . |
| MODULE k | MOD[-i(k),j] | k-TH MODULE ROUND-TRIP LINE DELAY:Tw(k)=i(k)∗Td
SYSTEM CLOCK Tck=J∗Td
MOD:RESIDUE FUNCTION

MEMORY SYSTEM

CROSS-REFERENCE TO RELATED APPLICATIONS

This application is a Continuation Application of PCT/JP00/08796 filed Dec. 13, 2000, the contents of which is incorporated herein by reference.

BACKGROUND OF THE INVENTION

The present invention relates to a technique for signal transmission between elements (e.g., between digital circuits including CMS's or between their functional blocks) such as multiprocessors or memories in an information processing apparatus and more particularly, to a technique for speeding up data bus transfer of a plurality of elements connected to an identical transmission line. More particularly, the present invention concerns a bus for connection between a plurality of memory modules and a memory controller as well as a system using the bus.

In order to transmit data at a high speed on a wiring bus through which a multiplicity of nodes such as a plurality of dynamic random access memory modules are connected to a memory controller, a transmission delay time based on the length of the wired buses cannot be negligible. SynchLink, "A Proposal for an Implementation of IEEE P1596.4 (Ramlink) Optimized for small (single board) Memory Systems", Mar. 23, 1995; WO99/48260 specification Publication; JP-A-7-141079; and Betty Prince, "High Performance Memories", John Wiley & Sons Ltd., 1995, p205-209, disclose a vernier for accommodating a time difference caused by the length of wiring lines between a clock signal which determines a timing reference of memory access and a read or write data signal in a memory bus wiring system, that is, a phase difference as well as signaling for improving a clock signal propagation direction. U.S. patent application Ser. No. 09/429,441 is directed to a directional coupling bus system.

SUMMARY OF THE INVENTION

It is therefore an object of the present invention to provide a memory access system which can suitably perform phase adjustment for access latency reduction in an information processing apparatus wherein read access is remarkably more frequent than write access to a memory.

Another object of the present invention is to provide a memory system which can solve such a problem in the prior art that inclusion of two clock input signals respectively in a phase adjustment circuit or vernier and in a plurality of DRAM module causes a chip area to be increased.

In accordance with an aspect of the present invention, there is provided a memory system which comprises:
 a memory controller;
 a clock generator connected to the memory controller for propagating a clock signal on a clock signal line toward the memory controller;
 a plurality of signal lines extended to be parallel and adjacent respectively to a part of the clock signal line between the memory controller and clock generator, one ends of the plurality of signal lines being connected to terminating resistances respectively so that, when the clock signal is propagated along the clock signal line, a crosstalk signal is propagated along the signal line in a direction opposite to the propagation direction of the clock signal; and
 a plurality of memory modules connected to the other ends of the plurality of signal lines.

The memory controller measures and holds a physical quantity corresponding to a signal propagation time between the memory module and memory controller in such a manner that the controller can adjust timing of write data transmission according to the physical quantity, that is, can eliminate a phase difference of a propagation delay time caused by the length of wired lines to the memory modules.

In a read priority memory system, for the purpose of giving a higher priority to read access, the clock signal is wired so as to take the same propagation delay time as data signal not from the memory controller (MC) but from a DRAM located at the furthermost end from the MC with respect to the propagation direction of the clock signal. Since this causes the propagation delay time of the clock signal becomes the same as that of the read data signal in the memory controller, the read data in the memory controller can be processed without any wait time. For this reason, the read access performance of the system can be improved. Of course, since the propagation directions of the clock signal and data signal are opposed to each other with respect to write data, it becomes necessary to access the write data at a timing corresponding to a delay amount depending on the location of each DRAM. That is, provision of a phase adjustment circuit or vernier in a write data side of the memory controller enables the write data to be written in the DRAM without any problems even in the case of read access priority wiring.

Since the present invention employs a read access priority system, it is necessary to obtain locative information for phase adjustment necessary for generation of timing of the write data. In other words, since the memory controller has substantially no phase difference between the clock signal and read data signal, it is required to obtain the locative information of the modules by another method.

In order to solve this problem, in accordance with the present invention, a mechanism which follows is provided.

In order for the memory controller to detect the locative information of the respective DRAM's, the memory controller drives a rectangular pulse signal on 1:1 wired lines. Since the input impedances of the DRAM's are highly high, the signal propagated on the 1:1 wired lines is totally reflected at the locations of the DRAM's. Thus when waveform observation is carried out in the memory controller, the pulse totally reflected with a time delay caused by the lengths of the wired lines is returned to the memory controller. As a result, the memory controller can obtain information on the locations of the DRAM's as round-trip propagation delay times on the wired lines.

In accordance with another aspect of the read priority memory system of the present invention, for the purpose of not folding back the clock signal wiring as in the prior art, but providing a unidirectional property to the clock signal wired lines, a single phase adjustment circuit or vernier is provided not in each of the DRAM's but in the memory controller side. As a result, there can be provided a memory system which has a small total chip area and a decreased pin number of DRAM's.

BRIEF DESCRIPTION OF THE DRAWINGS

FIG. 12 shows a map of a delay register;

DESCRIPTION OF THE EMBODIMENTS

Figure 1:
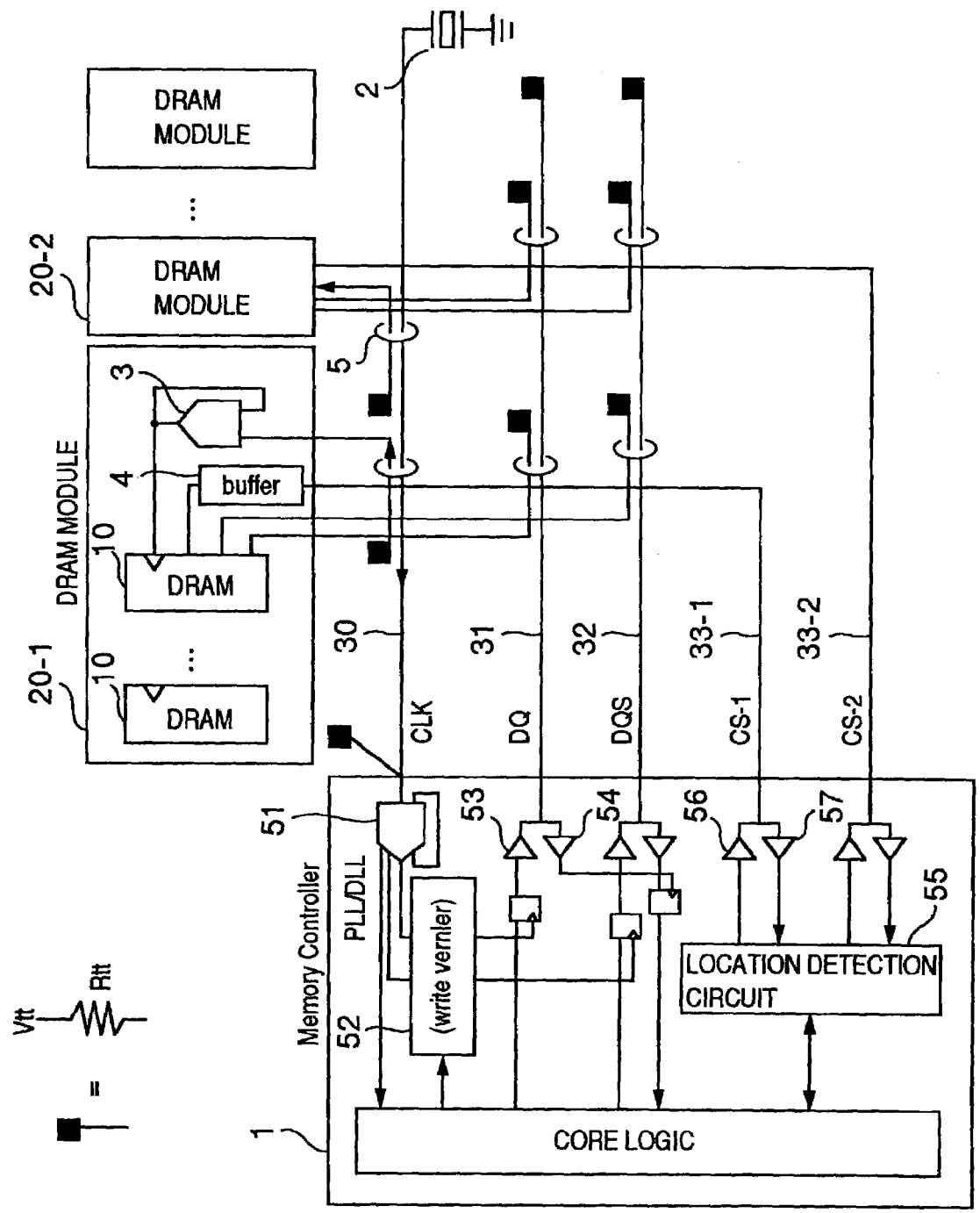
FIG. 1 is a diagram for explaining a first embodiment of the present invention.

A first embodiment will be explained with reference to FIG. 1.

An LSI chip 1 (which will be referred to as the memory controller or MC 1, hereinafter) having a memory control mechanism controls a plurality of memory modules 20-1, 20-2, . . . each having a plurality of memory chips (DRAM's) 10 mounted therein. Wired lines 30 to 32, 33-1 and 33-2 for signal transmission formed on a printed circuit board (not shown in FIG. 1) transmit various types of signal to the memory modules 20-1, 20-2, . . . Only two of the memory modules are illustrated in FIG. 1, but each of all the memory modules has the same purpose and effect which will be explained below, regardless of the number of such illustrated modules.

The wired line 30 is for a clock signal. The clock signal is generated by a clock generator 2 such as a crystal oscillator, propagated therefrom along the clock signal wired line 30, and then distributed to the respective DRAM's in the memory modules 20-1 and 20-2. In FIG. 1, a plurality of such DRAM's 10 are mounted in each of the memory modules 20-1 and 20-2, and a clock distributor 3 is provided in each DRAM in order to transmit an in-phase signal to these DRAM's in the same DRAM.

Provided in the clock signal wired line 30 are directional couplers 5 which are designated by an alphabet "C"-like representation having two wired lines. The directional coupler 5 is a circuit which generates a signal of a differential waveform on a terminated end of the other of the two wired lines when a signal such as a pulse signal is propagated along the clock signal wired line 30. The directional coupler is detailed, e.g., in JP-A-7-141079 entitled "noncontact bus wiring".

With respect to the directional coupler 5, the two wired lines are extended parallelly not as contacted nor branched but as spaced by a constant distance. For this reason, the directional coupler has a feature that characteristic impedances of the two lines are constant in this coupler. Thus the clock signal from the clock generator 2 can be transmitted with much less waveform distortion, because of the constant characteristic impedances of the lines.

The clock signal (CLK) propagated along the clock signal wired line 30 via the directional couplers 5 is transmitted to the DRAM memory modules 20-1 and 20-2 and then input into the clock distributors 3. After passing through all the DRAM modules of each module, the clock signal is applied to the MC 1 so that the MC 1 is matchedly terminated at the furthermost end as viewed from the clock generator 2. The matched termination is for the purpose of absorbing a reflected part of the signal propagated along the clock wired line 30, to which end the input impedance of the MC 1 to the clock signal may be made to be the same as the characteristic impedance of the wired line 30. In this case no terminating resistance is required.

Although the above explanation has been made in connection with the case where the directional coupler 5 is used to transmit the signal for bus wiring, an interface system such as a stub series terminated transceiver logic (SSTL) may be employed, providing the same effects as in the above. In this case, it is only required to replace all the directional couplers 5 by branched series-resistances used in the SSTL.

Further, signal transmission and reception (or transfer) is carried out between the DRAM's of the memory modules 20-1 and 20-2 and the MC 1 via the data signal wired line (DQ) 31 and the directional couplers 5 coupled therewith. Likewise, a strobe signal (DQS) for data can also be sent and received via the wired line 32 and the directional couplers associated therewith. These clock signal wired line 30, data signal wired line 31 and data strobe signal wired line 32 are formed each in the form of a bus having a single signal wired line and a plurality of element connected thereto.

The location detection signal wired lines 33-1 and 33-2 of the DRAM modules connect the MC 1 to the memory modules 20-1 and 20-2 in a 1:1 (point-to-point) relationship. Since a chip select (CS) signal from the MC is usually propagated in a 1:1 wired relationship in the memory system, the location detection signal may be used also as the CS signal. In FIG. 1, the wired line 33-1 and 33-2 for module location detection use the location detection signal commonly to the CS signal. The CS signal is distributed by a buffer 4 to the respective DRAM's 10 within the module 20-1. Of course, the buffer 4 can also be used for distribution of another address signal or control signal. In the illustrated example, the wired lengths of the DRAM module location detection signal wired lines 33-1 and 33-2 are lengths from signal pins (not shown in FIG. 1) of the MC 1 to input pins of the buffers 4 within the memory modules 20-1 and 20-2, and are substantially the same as the lengths of the DQS wired line 32, DQ signal wired line 31 and clock wired line 30 from the signal pin of the MC 1 to input pins of the DRAM's 10 within the module 20-1. For this reason, their data signal propagation delay times are also the same. As a result, in the wiring lines, parts of the wired lengths between the MC 1 and DRAM's 10 which are located within the modules are mutually the same, and the other parts thereof between the MC 1 and DRAM's 10 are different from each other.

The MC 1 contains a core logic for performing operation and control such as address calculation and memory address control as well as a clock signal stabilization circuit 51 (such as a phase locked loop (PLL) or a delay locked loop (DLL)).

Signal transmission and reception to and from the DRAM 10 is carried out through a driver 53 and a receiver 54 connected to the DQ and DQS signals. Further an input circuit of a clock signal stabilization circuit 51 may have the same characteristics as those of the driver 53. The location detection of the DRAM modules is carried out through a driver 56 and a receiver 57 connected to the location detection signal wired lines 33-1 and 33-2.

Also included in the MC 1 is a phase adjustment circuit or write vernier 52 which generates timing of write data. The DRAM 10 generally has a time restriction requirement to write data to the clock signal, and the memory controller MC 1 is required to perform its timing adjustment so as to meet the restriction requirement, for which purpose the write vernier 52 within the MC 1 is used. Since the lengths of the signal wired lines 30, 31 and 32 from the MC 1 to the memory modules 20-1 and 20-2 are different from each other, the propagation delay times of signals propagated along these lines are also different, but differences between the propagation times are also accommodated by the write vernier 52. As a result, the MC 1 can transmit write data at timing of an enough margin even to the DRAM's 10 of any of the modules.

Further included in the MC 1 is a circuit 55 for detecting the locations of the memory modules 20-1 and 20-2. The location detection circuit 55 measures a distance therefrom to the module 20-1 with use of the driver 56, receiver 57 and location detection signal wired lines 33-1 and 33-2. The location detection signal wired lines 33-1 and 33-2 are connected in a 1:1 wired relationship with a length equal to the wired length of the DQ, DQS or clock signal from the MC 1 to the module 20-1 or with the same signal propagation delay time, so that the location detection circuit 55 can measure the propagation delay time with use of such wiring.

The principle of measuring the propagation delay time is as follows. When the location detection circuit 55 is made up of a C-MOS, the input impedance of the buffer 4 within the module 20-1 is very high and thus total reflection takes place thereat. Thus when the circuit finds a difference between a pulse output time from the driver 56 and a time at which the receiver 57 observes the pulse totally reflected at the buffer 4, the circuit can know a round-trip propagation time from the MC 1 to the module 20-1. The observed time difference is equal to a sum of the round-trip propagation delay time of the wired line 33-1 and the propagation delay time of the driver 56 and receiver 57. In general, the delay time of the driver 56 and receiver 57 is shorter than the round-trip delay time of the wired line 33-1, so that the location detection circuit 55 can measure the round-trip propagation delay time from the MC 1 to the module through the above operation. Of course, the detection circuit can measure a round-trip propagation delay time in the same manner as even for the module 20-2 and the wired line 33-2 of a CS-2 signal.

Locative information indicative of the propagation delay time measured for each of the memory modules 20-1 and 20-2 is sent to the write vernier 52 for generation of write timing of the write data, where data for phase adjustment of each module to be written is stored. This may be of course set by a core logic.

Explanation will next be made as to details of the location detection system with reference to FIG. 2. FIG. 2 corresponds to an extraction of a part (corresponding to one circuit) associated with the location detection from FIG. 1. Parts having the same functions as those in FIG. 1 are denoted by the same reference numerals in FIG. 2.

In an arrangement of FIG. 2, an input of the driver 56 and an output of the receiver 57 are connected to the location detection circuit 55 within the MC 1, an output of the driver 56 and an input of the receiver 57 are connected to an I/O pin of the MC 1 for external connection of the MC 1 via the I/O pin. The receiver 57 monitors a voltage state of the wired lines connected to the I/O pin by monitoring a voltage of the I/O pin. The buffer 4 within a buffer module 20 is connected to the I/O pin of the MC 1 via a wired line 33, a connector 15 and a wired line 36. It is assumed that the wired line 33 has a characteristic impedance Zo and a wired length L0 and the wired line 36 has a characteristic impedance Zo' and a wired length L1.

The location detection circuit 55 drives a pulse signal via the driver 56. The driven pulse signal passes through the wired line 33, connector 15 and wired line 36, and reaches the buffer 4. Since the buffer 4 has a high input impedance, the pulse signal is totally reflected at the input part of the buffer 4 as a reflected wave. The reflected wave is propagated along the same route as the above but in the opposite direction toward the MC 1. When the input impedance of the driver 56 is set to be equal to the characteristic impedance Zo of the wired line 33, the reflected wave can be absorbed and thus re-reflection at the I/O pin of the MC 1 can be prevented.

The receiver 57 can catch the reflected wave by monitoring a voltage change at the I/O pin and can observe a time from a pulse output time of the driver 56 to a returned reflected-wave time.

Figure 2:
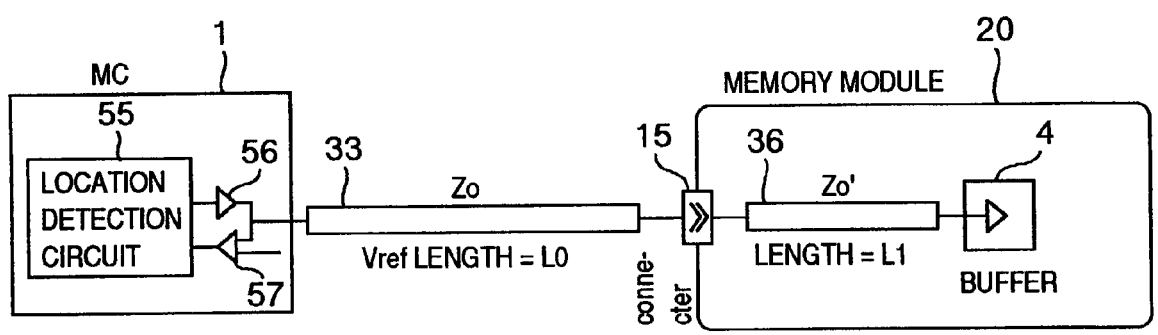
FIG. 2 is a wired diagram of a module location detection circuit in the present invention.
Figure 3:
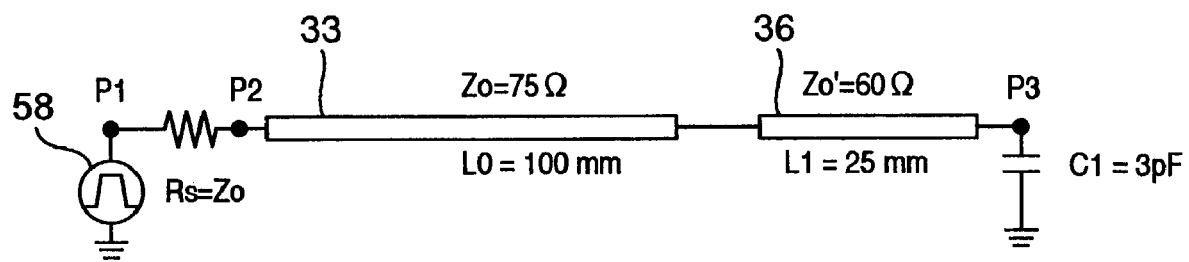
FIG. 3 is a diagram for explaining the principle of module location detection.

Voltage waveform simulation at the I/O pin was carried out with use of FIG. 3 showing an equivalent circuit of the circuit of FIG. 2. The driver 56 is equivalent to a voltage source 58 and a resistance Rs connected in series therewith. It was assumed that the wired line 33 has a wired length of 100 mm and a characteristic impedance Zo of 75Ω and the wired line 36 within the buffer module 20 has a wired length of 25 mm and a characteristic impedance Zo' of 60Ω. A difference between these impedances was from the consideration that, in the actual system, the printed circuit board and the module 20 wired by the wired line 33 are separated parts. The input impedance of the buffer 4 was equivalent to a capacitance C1 having a typical value of 3 pF. Observation points was denoted by P1, P2 and P3. A signal propagation rate on the wired line was set at 138 mm/ns, assuming that glass epoxy resin PCB is used.

Figure 4:
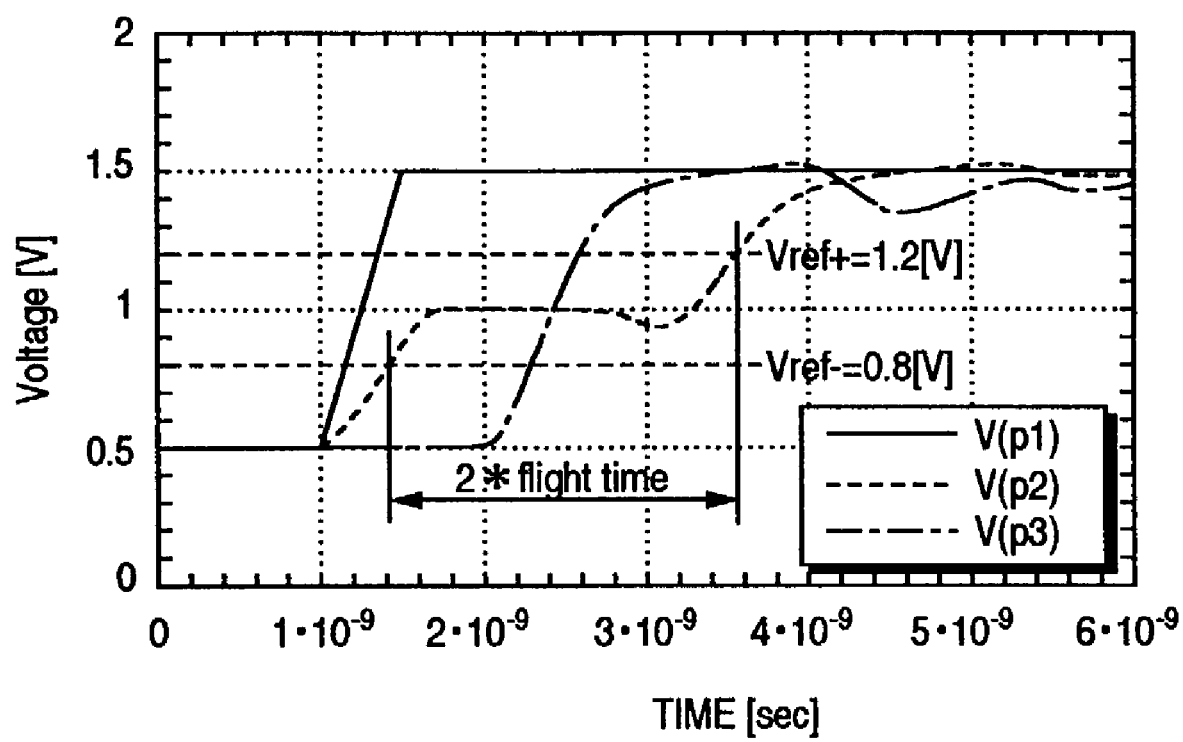
FIG. 4 shows simulated waveforms in the module location detection.

Wave simulation was carried out at the respective points when the voltage source 58 was driven with an amplitude of 1V from 0.5V to 1.5V and a transition time of 0.5 ns, which results are shown in FIG. 4. In the drawing, a solid line denotes a voltage waveform at the point P1 as the output point of the voltage source 58, a dotted line denotes a voltage waveform at the point P2 corresponding to the I/O pin, and a dashed line denotes a voltage waveform at the point P3 corresponding to the input of the buffer 4. The voltage at the point P2 rises from 0.5V at a time of 1 ns and once becomes constant at 1V. The voltage is determined by a voltage division ratio between Rs (=Zo) as the impedance of the driver 56 and the characteristic impedance Zo of the wired line. And the voltage starts to increase from a time point of about 3.4 ns toward 1.5V for the reflected wave from the input end of the buffer 4. A difference between these two rising times corresponds to a pulse round-trip time between the wired lines 33 and 36. The P3 voltage starts to rise at a time of about 2 ns corresponding to an intermediate of the two rising times of the P2 voltage, which time is a P3 pulse propagation time. In FIG. 4, the propagation delay time of the wired lines 33 and 36 was denoted by Tflight (flight time). Provision of the resistance Rs on the drive side causes no re-reflection on the P2 side.

As will be seen from FIG. 4, the voltage at the I/O pin (P2) takes three levels of low (L), middle and high (H) and the transition time between these three values corresponds to a round-trip propagation delay time (2*Tflight) of the wired lines 33 and 36. Thus, a time difference between the P1 drive pulse and a time of the P2 voltage crossing the level at Vref+ is considered to be equal to the above round trip time. In other words, only by observing the drive pulse and the position P2 as the I/O pin position, the wired line delay time down to the module 20 can be measured and locative information on the module 20 can be obtained. This is the same as a method called a time domain reflectometry (TDR) method.

In FIG. 2, provision of a hysteresis characteristic to the receiver 57 enables the two transitions to be measured with a much increased noise resistance. Assuming that the two-input receiver 57 has a reference voltage Vref, then the output voltage of the receiver 57 is inverted with a slight offset to the voltage Vref due to the hysteresis characteristic. The output voltage is denoted by Vref+ or Vref−. In FIG. 4, when Vref is 1V, Vref+ is 1.2V and Vref− is 0.8V, the receiver 57 becomes responsive at positions shown by horizontal dotted lines. As shown in FIG. 4, the output of the receiver is inverted when transversing the voltage Vref+ for a rising pulse and when transversing the voltage Varef− for a falling pulse. Even when a waveform at the point P2 is distorted due to a disturbance in the characteristic impedance on the transmission line, for example, due to a difference between Zo and Zo' of the two wired lines 33 and 36 or to the connectors 15 having different impedances; noise immunity is improved by the hysteresis offset voltage of the receiver 57. That is, noise immunity is high. In this way, when the receiver 57 having such a hysteresis characteristic is used, the receiver can stably catch the reflected wave even when the waveform is disturbed by a slight degree of impedance mismatching.

Figure 5:
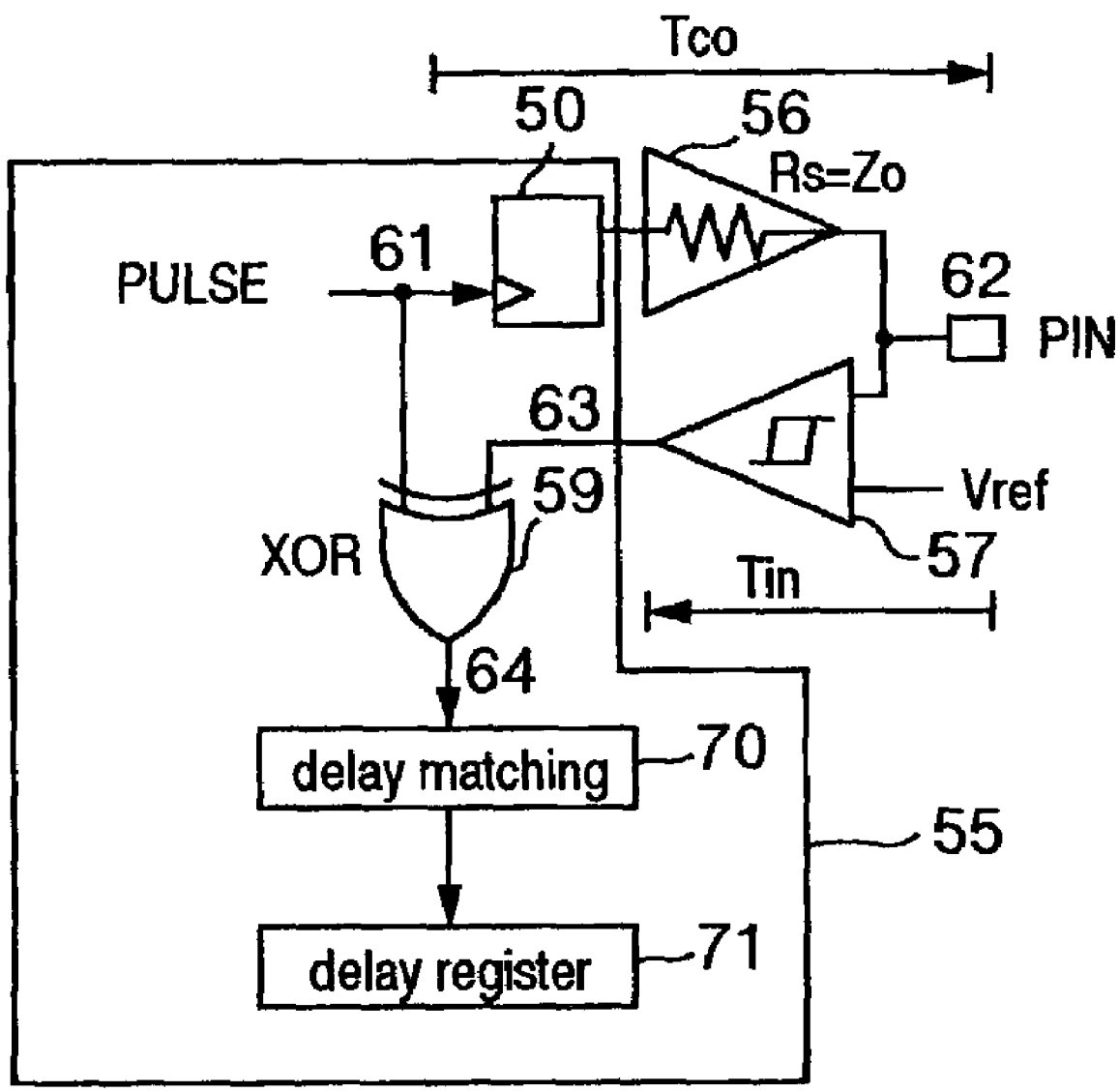
FIG. 5 is a first example of the module location detection circuit.

Explanation will then be made as to the operation of the location detection circuit 55 by referring to FIG. 5.

The location detection circuit 55 includes flip flop (FF) 55 and a logical exclusive "OR" (XOR) circuit 59 synchronized with a clock edge, delay matching circuit 70, and a delay register 71. An output of the FF 50 is connected to an input of the driver 56, and an output of the receiver 57 having the hysteresis characteristic is connected to an input of the XOR 59, respectively. A pulse signal 61 applied to a clock terminal of the FF 50 has a pulse width longer than the round-trip wired line delay time to be measured. Also shown in FIG. 5 are an I/O pin 62, an output signal 63 of the hysteresis receiver 57, and an output 64 of the XOR 59.

Figure 6:
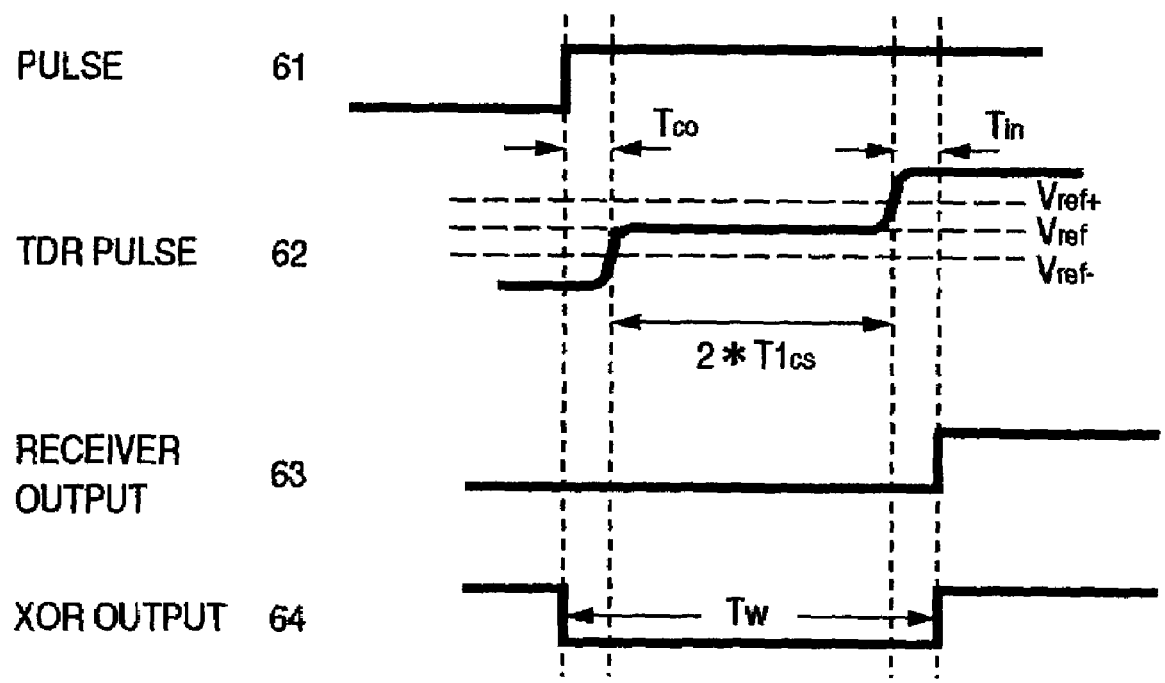
FIG. 6 is a diagram for explaining timing of the module location detection circuit.

FIG. 6 shows waveforms of various signals, that is, states of the signals when the location detection circuit FF 55 receives the pulse signal 61 to cause the output of the FF 50 to rise.

Assuming that a time difference between the input of the pulse signal 61 to the FF 50 and the output of the driver 56 is denoted by Tco, then voltage signal 62 at the I/O pin rises as delayed by the time Tco with respect to the signal 61 as shown in FIG. 4. Assuming that the delay time of the receiver 57 is denoted by T1, then the reflected wave is returned to the I/O pin so that the output signal 63 is inverted as delayed by Tin from a Vref+ transversal time. Logical XOR operation of the two signals 61 and 63 at the XOR 59 produces a output signal 64. The pulse width (Tw) of this output signal is expressed as follows.

$$Tw = Tco + 2*Tflight + Tin \quad \text{(Equation 1)}$$

Similarly, even for the falling pulse signal 61, the output signal 64 having the same pulse width Tw can be obtained. Using the output signal 64, the delay matching circuit 70 transfers the delay time Tw in such a manner as will be explained below, that is, reads a round-trip delay time T1 including Tco and Tin.

Figure 7A:
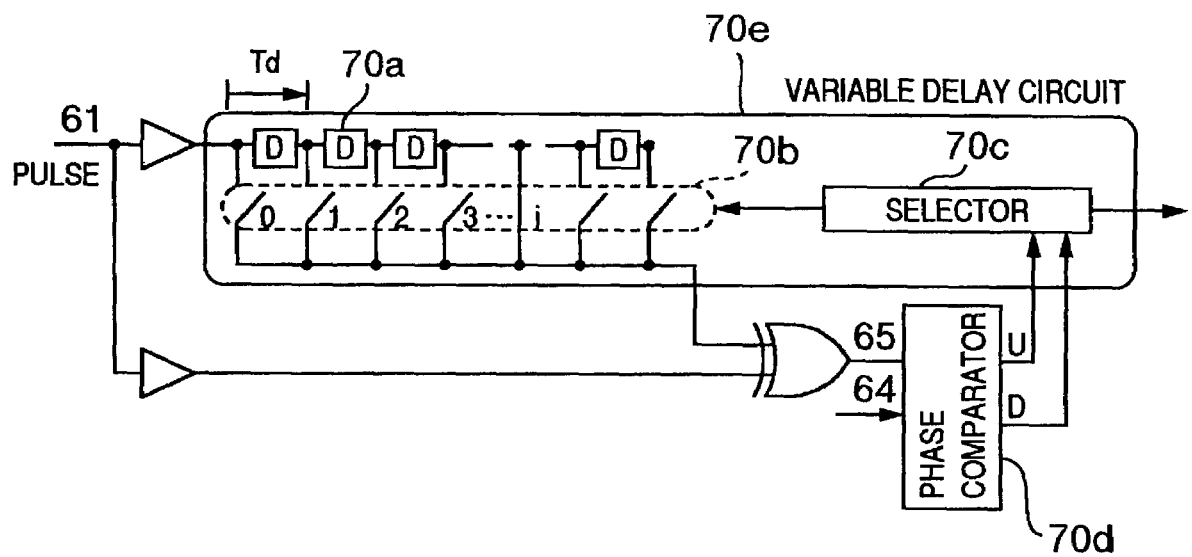
FIGS. 7A and 7B are diagrams for explaining timing of signals in the module location detection circuit.
Figure 7B:
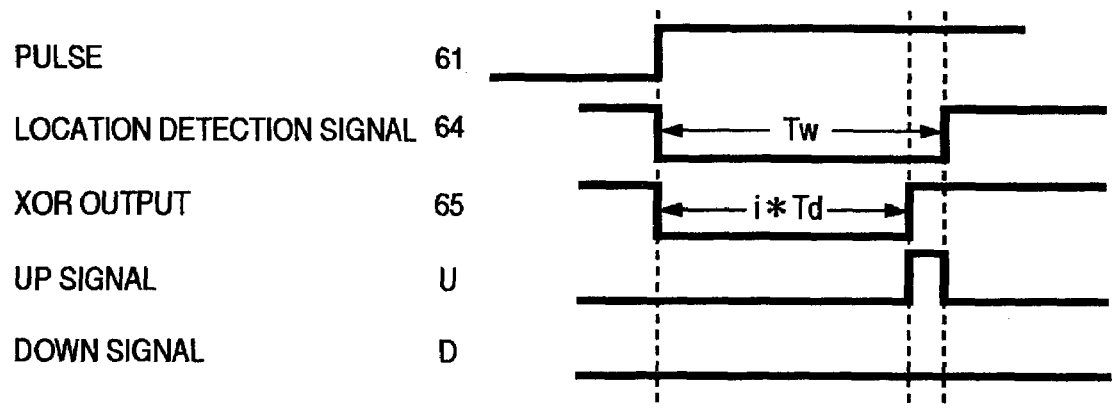

An example of the configuration of the delay matching circuit 70 is shown in FIG. 7A.

In the delay matching circuit 70, small delay elements 70a are arranged in the form of multiple stages to be selected by a selector 70c and be changed over by a switching means 70b, and thus operate as variable delay elements. The number of stages of the delay elements is adjusted so that the delay time becomes equal to the pulse width Tw of the location detection signal 64 shown in FIG. 6. The delay elements may comprise, for example, two inverters or other circuit elements connected in series. In its basic operation, when delays of the delay elements are 0, 1, 2, 3, . . . , i, . . . in an increasing order, an i-th variable delay time is $i*Td$. It will be appreciated that, though the logical XOR operation of the signal after delayed and the pulse signal 61 produces a signal 65, a state of an excess or lack in the varied delay amount can be seen by phase comparison between the signal 65 and location detection signal 64. When the delay amount is less, a phase comparator 70d outputs a UP signal to increase the delay amount. When the delay is in excess, the phase comparator 70d operates to output a DOWN signal to decrease the delay amount. Through the adjustment of the stage number and the repetitive phase comparison, a delay circuit can be obtained having the same length as Tw with a delay amount Td of the delay elements 70a as a resolution.

In this way, the delay element 70a of the i-th stage has the same length as the delay amount Tw of the output signal 64, that is, the stage number i is equivalent to Tw. This value is a set value itself of the selector 70c, when the set value is stored into the delay register 71 of FIG. 5 from the selector 70c, a delay value equal to the delay amount Tw can be obtained. When the variable delay circuit 70e having the same delay amount Tw is provided in the MC 1 and the same stage number i is set, a circuit having the same delay amount Tw can be positioned anywhere in the MC 1. Of course, the register 71 is arranged to be able to set and hold a value for each module.

Figure 8:
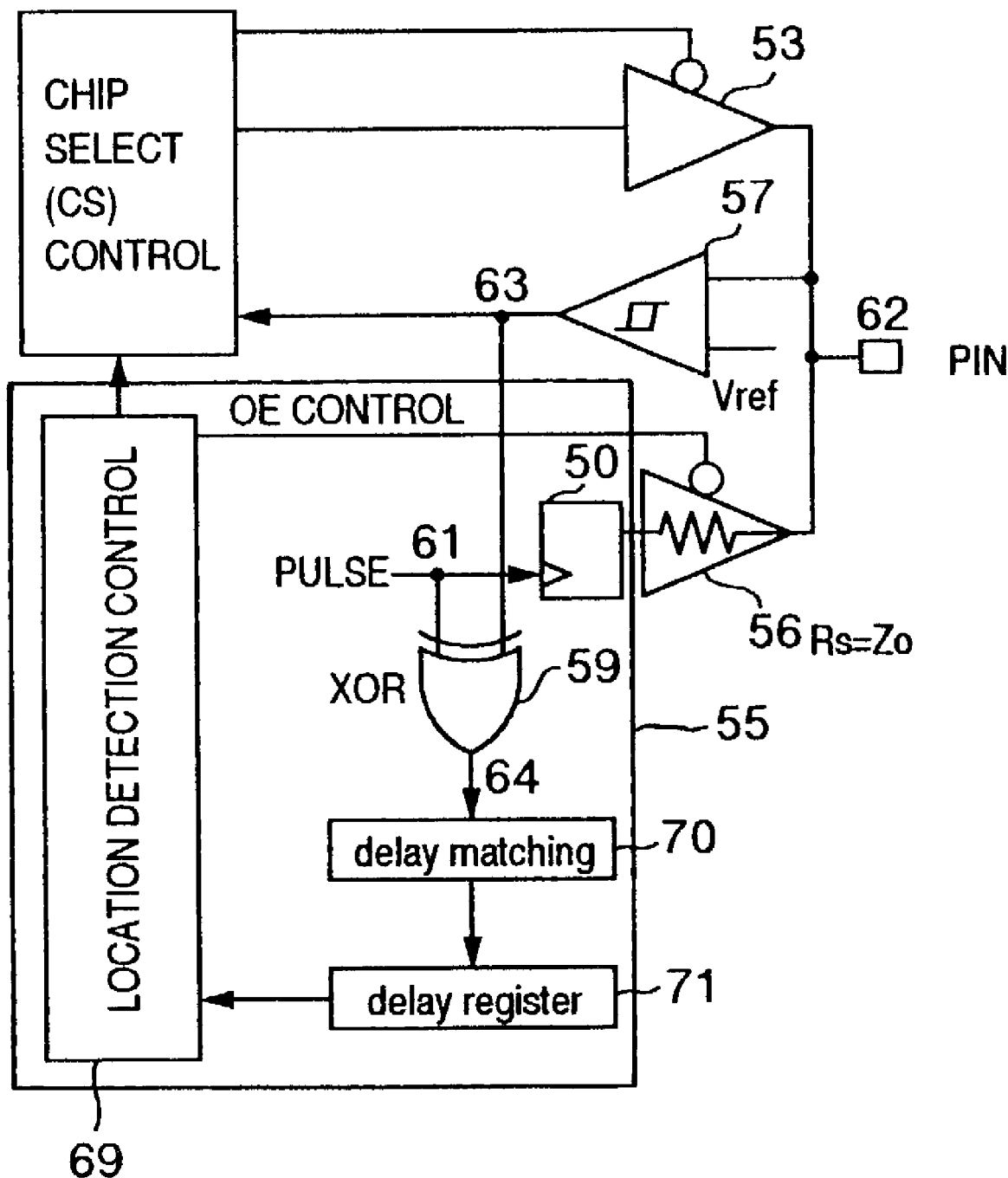
FIG. 8 is a second example of the module location detection circuit.

Further, location detection signal may be commonly used with other signals as shown in FIG. 8. As already explained above, the signal of the location detection circuit 55 is a unidirectional signal connected from the MC 1 to the buffer module 20 in the 1:1 relationship, and the chip select (CS) signal is also a unidirectional signal. For this reason, the signal of the location detection circuit 55 and CS signal can be commonly used. To this end, the I/O pin can be shared by switching between the driver 53 of the CS control system and the location detection driver 56. The switching between these can be achieved by enable control (OE control) for the output of the driver 56 under control of a location detection control 69.

For the switching between these, it is necessary to provide the two drivers 53 and 56. This is because the output impedance of the driver 53 of the CS control system is generally lower than the characteristic impedance Zo of the wired line and thus the driver 56 for location detection having an output impedance equal to Zo is different in output impedance from the driver 53. As a matter of course, even when a single driver having a low output impedance for the CS signal and having a high output impedance for the position detection is used, the same effects as the above can be obtained.

The driver 53 is used for memory access, the driver 56 is used at the time of detection of a module location, the drivers being switched between these operations. It is a matter of course that the detection of the memory module location is carried out prior to the memory access of the system and usually after turning ON of power of the system. However, when the memory module is of a type which allows insertion of the memory substrate on active wire, it is required to perform the location detection immediately after the memory module insertion even during operation of the system. The location detection of the module may be carried out during the system operation at intervals of a constant time. In this case, it is possible to correct the delay of the delay element 70a to voltage fluctuations and temperature fluctuations within the MC 1. This is required by the system.

Figure 9:
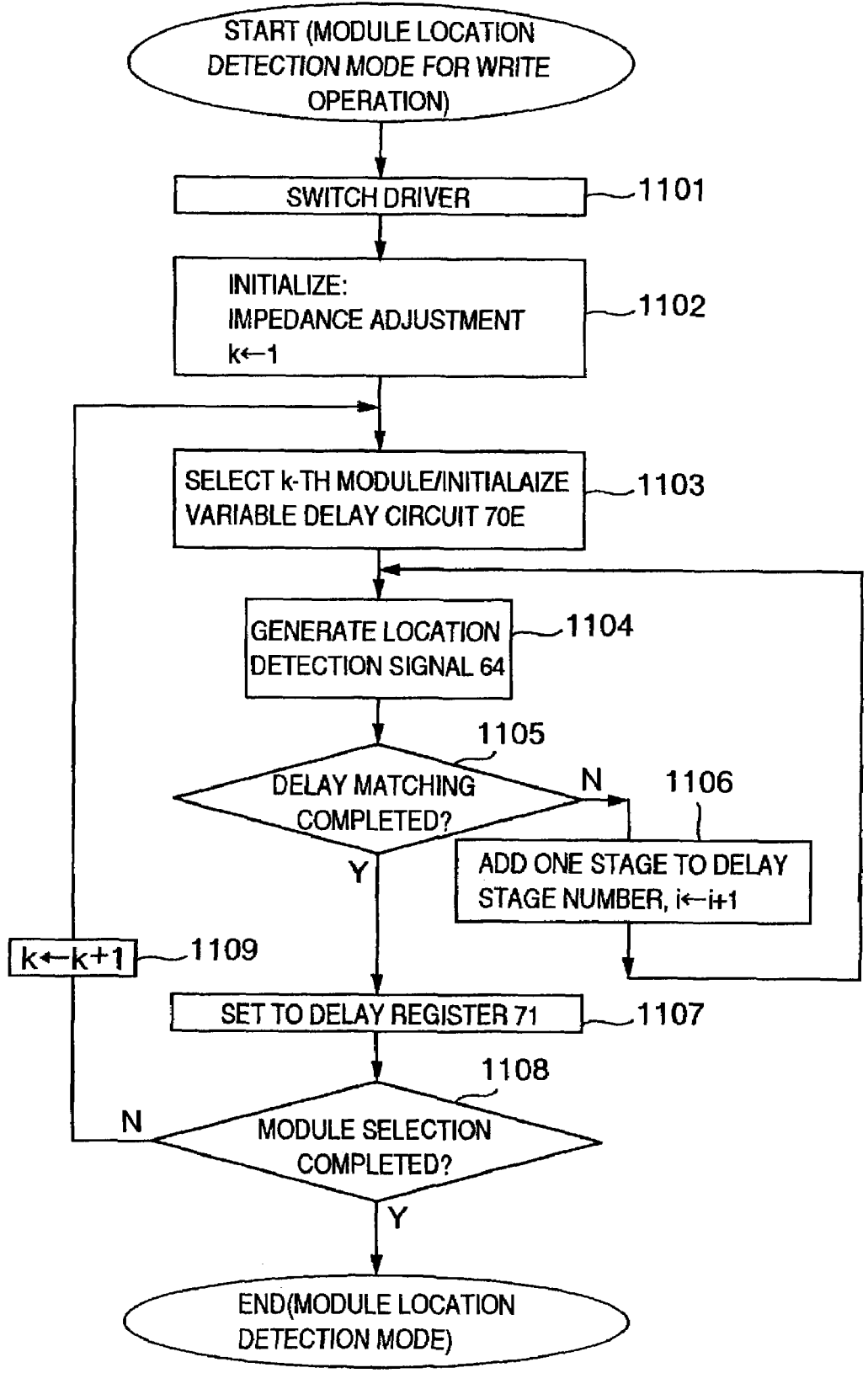
FIG. 9 is a flowchart of a module location detection sequence.

FIG. 9 shows a location detection sequence for all the memory modules 20-1 and 20-2 connected to the MC 1 as shown in FIG. 1. This sequence will be called a module location detection mode.

First of all, the driver is switched at a step 1101. At the step 1101, the driver is switched from the CS control system driver 53 to the location detecting driver 56 in such a system that both a CS signal and a location detection signal are connected as shown in FIG. 8.

At a next step 1102, initialization is carried out. The output impedance of the driver 56 is set at the characteristic impedance of the wired line connected to the driver 56. For example, the resistor Rs equal to the impedance of the wired line is connected to a voltage Vcc, and is also connected at the other end to the separated driver 56. When the driver has a Low output, the impedance of the driver is adjusted so that the output voltage of the driver becomes 1/2 Vcc, whereby the driver can have an output impedance matched to the impedance of the wired line. This holds true even for the impedance for High output.

At the step 1102, "1" is set for a register k for module selection. The register k denotes a module number.

At a next step 1103, the k-th module connected to the memory bus is selected and the variable delay circuit 70e within the location detection circuit 55 is initialized. That is, the delay is set to be a minimum or maximum. When the delay is set to be a minimum, this becomes equivalent to i=1, where i is a value corresponding to the switching stage number of the delay elements 70a.

At a step 1104, a location detection signal 64 is generated.

At a next step 1105, it is judged whether or not the delay of the variable delay circuit 70e is equal to the Tw of the location signal 64. If the pulse widths are not equal, then control goes to a step 1106.

At the step 1106, the delay within the variable delay circuit 70e is made longer (or shorter) by one stage. That is, the value of i is set to be i+1 and control is returned to the step 1104 for repeat the same procedure.

When delay matching is achieved, control moves from the step 1105 to a step 1107.

At the step 1107, the stage number i as the delay matched by the variable delay circuit 70e is stored in the delay register 71. At a step 1108, it is judged whether or not the module selection is completed. If not then control goes to a step 1109 where the value of the module selection register is incremented by 1 to repeat the operations of the step 1103 and subsequent steps.

Through the aforementioned sequence, a round-trip propagation delay time from the MC 1 for all the modules is set for the delay register 71. That is, information corresponding to the delay amount of the variable delay element shown by the Equation (1) for each module is stored in the delay register 71. Thereby the MC 1 can know the delay amount as the locative information of the module. In this system, the delay can be accurately measured regardless of the temperature of the MC 1. This is because, when the circuit is of a C-MOS type, a junction temperature during operation of the circuit causes great fluctuation of the delay of the delay elements 70a, but the location detection circuit 55, the delay matching circuit 70 and the other variable delay element within the MC 1 for use in the measurement are considered to have substantially the same temperature within the same chip, even when there is a local temperature gradient. Further even when the temperature becomes different from the temperature of the delay register 71 set during the operation, the temperature influences can be excluded by re-measurement.

Figure 10:
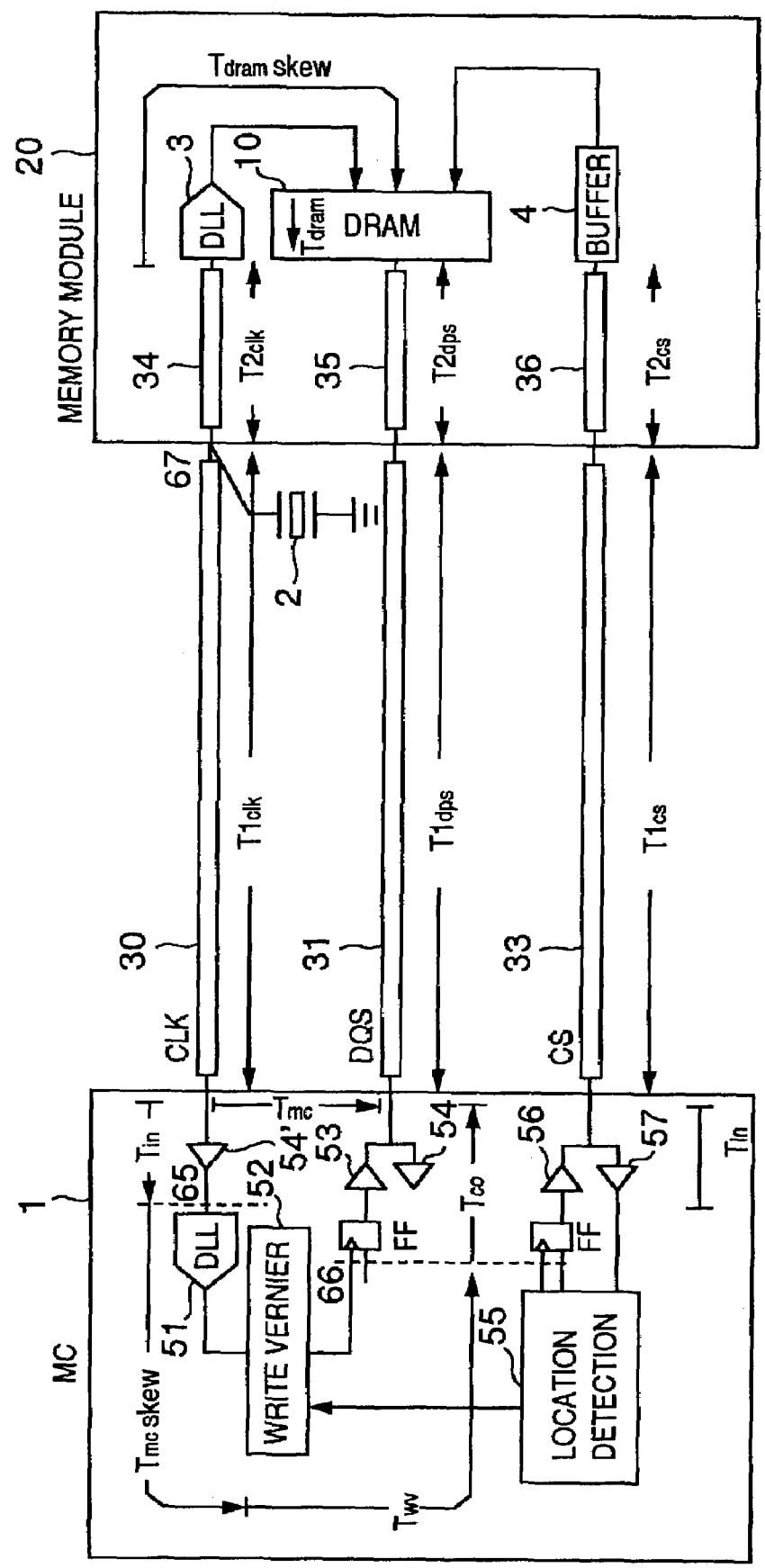
FIG. 10 is a diagram for explaining how to adjust write data timing.

Explanation will next be made as to the operation of the write vernier 52 shown in FIG. 1, by referring to FIG. 10 showing a time relationship at the time of writing data from the MC 1 into the module.

The purpose of the write vernier 52 is to set the clock signal and data signals (DQ and DQS signals) or a control signal applied to the module 20 in a write mode so as to have a constant phase relationship with respect to the clock signal regardless of the location of the buffer modules 20. That is, the MC 1 adjusts timing of the write data as a send signal in such a manner that the DRAM 10 within the module 20 satisfies the timing requirements of the DQ and DQS signals to the clock signal. For a read mode, the system is designed as a memory read priority memory system to transmit the clock signal in FIG. 1 from the far module to the memory controller to thereby realize phase adjustment.

To this end, the write vernier 52 is intended to control the timing of the write data according to the distance of the module in such a manner that the data transmission timing becomes constant to the clock applied to the module regardless of the far or close distance of the module 20.

Explanation will first be made as to how to compute timing of the signals at the module location.

In FIG. 10, for the sake of simplicity, one memory module 20 is illustrated as connected to the MC 1. In wiring, only wired lengths as parameters for time computation are illustrated and couplers and terminating resistances are omitted. For the other modules, computation can be done similarly only by changing the wired lengths. Further, since the data signal DQ and data strobe signal DQS are designed to have the same wired length, only the data strobe signal DQS is illustrated in FIG. 10 as a representative one. The same holds true even for the data signal DQ or control signal bus-connected.

The clock signal from the clock generator 2 is applied to the MC 1 via the module 20. At this time, a phase difference (time difference) in the pulse edge of the clock signal between the module 20 and MC 1 is equal to a propagation time of the pulse propagating along the length of the clock wired line 30, and a propagation delay time obtained by multiplying the wired length by the propagation rate is denoted by T1cl. Similarly a propagation delay time of the data strobe signal DQS between the MC 1 and module 20 propagating along the wired line 31 is denoted by T1dqs, and a propagation delay time of the CS signal for location detection propagating along the wired line 33 is denoted by T1cs. Further, within the module, a propagation delay time of the clock signal propagating along the wired line 34 is denoted by T2clk, a propagation delay time of the DQS signal propagating along the wired line 35 is denoted by T2dqs, and a propagation delay time of the CS signal propagating along the wired line 36 is denoted by T2cs.

A delay time (Tmc) from the clock input to data output within the MC 1 will be computed as follows.

$$Tmc = Tin + Tmcskew + Twv + Tco \quad \text{(Equation 2)}$$

Where, Tin denotes a skew from the clock input to the internal signal 65 as the output of a receiver 54', Tmcskew denotes a skew of the a clock signal stabilization circuit (DLL) 51, Twv denotes a delay time of the write vernier 52, and Tco denotes a delay time taken from the output signal 66 of the write vernier 52 via an FF to the output of the driver 53.

Next a time difference (Tdram) of the data DQS signal to the input clock of the DRAM 10 within the module 20 as required based on its specification will be computed. The time difference is computed by Equations (3) and (4) which follows, with the clock input signal 67 to the module 20 as a reference.

$$Tdram = T1clk + Tmc + T1dqs + T2dqs - T2clk + Tdramskew \quad \text{(Equation 3)}$$

$$= T1clk + Tmc + T1dqs + Tdramskew \quad \text{(Equation 4)}$$

Where, Tdramskew denotes a skew from the clock input to the phase stabilization circuit (DLL) 3 to the clock input of the DRAM 10 and may have positive and negative signs and become zero when averaged. Assuming that a difference in length between the wired lines 34 and 35 is negligible, then Tdramskew is expressed by the Equation (4). Similarly, assuming that a difference in length between the wired lines 30 and 31 is designed to be negligible, then Tdramskew is expressed by Equations (5) and (6) which follow.

$$Tdram = 2*T1 + Tmc + Tdramskew \quad \text{(Equation 5)}$$

$$= (Tin + 2*T1 + Tco) + Twv + Tmcskew + Tdramskew \quad \text{(Equation 6)}$$

In the above equations, approximation was carried out as follows.

$$T1 = T1clk \approx T1dqs \approx T1cs \quad \text{(Equation 7)}$$

Meanwhile, a variable delay time Tw measured by the location detection circuit 55 is expressed by the following Equation (1).

$$Tw = Tin + 2*(T1cs + T2cs) + Tco \quad \text{(Equation 8)}$$

It is assumed in the Equation that the receiver 57 for location detection has the same delay time Tin as the receiver 54' for clock signal. Substituting the Equation (8) into the Equation (6) results in an Equation (9) which follows.

$$Tdram = Tw - 2*T2cs + Twv + Tmcskew + Tdramskew \quad \text{(Equation 9)}$$

The time difference Tdram of the data DQS signal to the input clock of the DRAM 10, when a minute uncontrollable skew part is erased therefrom, is expressed as follows.

$$Tdram = Tw + Twv - 2*T2cs \quad \text{(Equation 10)}$$

Where, T2cs denotes a propagation delay time of the wired line 36 within the module 20, and the wired line 36 has a fixed length independently of the location of the module 20. For this reason, in the MC 1, when the write vernier 52 controls the delay amount Twv on the basis of Tw observed as the locative information of the module 20, specified timing can be generated for all the DRAM's 10.

Further, when the location detection circuit 55 is arranged as shown in FIG. 5, the delay Tw based on the location of the module 20 can be transferred in the form of including Tco and Tin. That is, accurater correction can be realized.

As has been explained in the foregoing, when the delay Twv expressed by the following Equation (11) is generated by the write vernier 52 for each module, it can be generated at the same timing for all the DRAM's 10.

$$Twv = Tdram + 2*T2cs - Tw \quad \text{(Equation 11)}$$

Tdram determined by the specifications of the DRAM 10 and 2*T2cs as a fixed value may be offset to measure "–Tw" for each module.

Figure 11A:
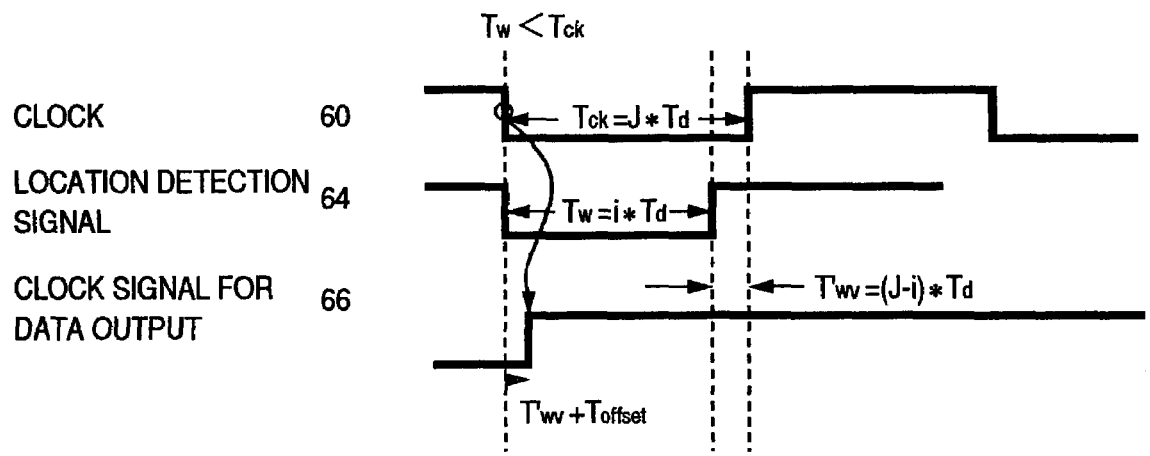
FIGS. 11A and 11B are diagrams for explaining write timing of signals.
Figure 11B:
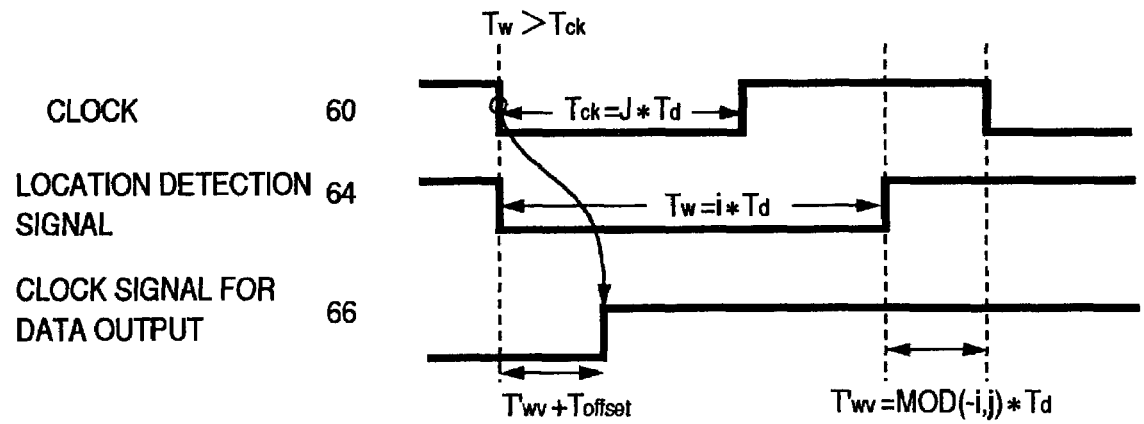

Where, Tw has a negative value "–Tw" which can be realized by such a manner as shown in FIGS. 11A and 11B. "–Tw" will be written as T'wv. Even for a system clock 60, the variable delay circuit 70e of FIG. 7A can be used to measure the stage number of delay elements. Assume now that the J-stage element has a delay (J*Td) for half cycle Tck of the system clock 60. When Tw<Tck in FIG. 11A, T'wv is expressed as follows, because Tw is of the i-stage (i being a positive integer).

$$T'wv = (J - i)*Td \quad \text{(Equation 12)}$$

Even when Tw>Tck in FIG. 11B, T'wv is written as follows.

$$T'wv = MOD(-i, J)*Td \quad \text{(Equation 13)}$$

Where, MOD is residue function. For example, MOD(10, 3) is 1, MOD(–1, 3) is 2. The Equation 12 indicates a residue when quotient is 0, and is equivalent to the Equation (13). Likewise, in place of the Equation (11), the delay may be set by the following Equation (14).

$$Twv = MOD(Tdram + 2*T2cs - Tw, Tck) \quad \text{(Equation 14)}$$

The above equation involves simple arithmetic operations when the above quantities are made discrete by the delay time of the delay elements 70a. In this case, it becomes unnecessary to have a delay circuit (Tdram+2*T2cs) for offset and thus the circuit can be made simple.

FIG. 12 shows an example of the structure of the delay register 71 for such operation as mentioned above.

FIG. 12 shows a map for the register 71, wherein a possible maximum number (k) of mountable modules are prepared. Each register has addresses corresponding to the sequential order numbers of the modules and has delay stage numbers computed by the Equation (13) as data. In FIG. 12, MOD[–i (k),J] in the Equation (13) is stored as the delay stage number, contents of which is a residue computation result of –i(k) obtained by multiplying by –1 a delay element stage number i(k) determined by the location detection circuit 55 for the k-th module and an equivalent stage number J of the system clock. Similarly the contents may be a computation result of the Equation (14).

A clock signal 66 as the output signal of the write vernier 52 is generated from the system clock 60 as a delay corresponding to a sum of the delay T'wv expressed by the Equation (13) and an offset (Tdram+T2cs). As a result, even for any of the DRAM's 10, the delay time Tco of the driver 53 from the FF, the round-trip delay time T1 of the wired line 31, and the input delay time Tin of the receiver 54' can be canceled; and write data can be written into all the memory modules by Tdram showing a phase relationship between the clock signal and write data as the specification of the DRAM 10. Further, when the wired line between the MC 1 and memory module 20 has a long length, Tw may be as several times large as Tck. Even in this case, the delay time of the Equation (13) may be used. This is because the data clock signal 66 is used to find a residue in the period of the system clock 60. Further, since the system clock has a half period Tck in FIGS. 11A and 11B, the timing of the data signal arriving at the DRAM 10 is shifted by the half period with respect to the clock signal. However, if the memory is, e.g., of a double data rate synchronization DRAM (DDR-SDRAM), then this causes no problem. In the case where the memory is of a single data rate type, if the clock signal as a reference is frequency-divided to have a clock period Tck, the data signal and system clock are in phase with each other and thus the clock period can be adjusted according to the selected memory.

Figure 13:
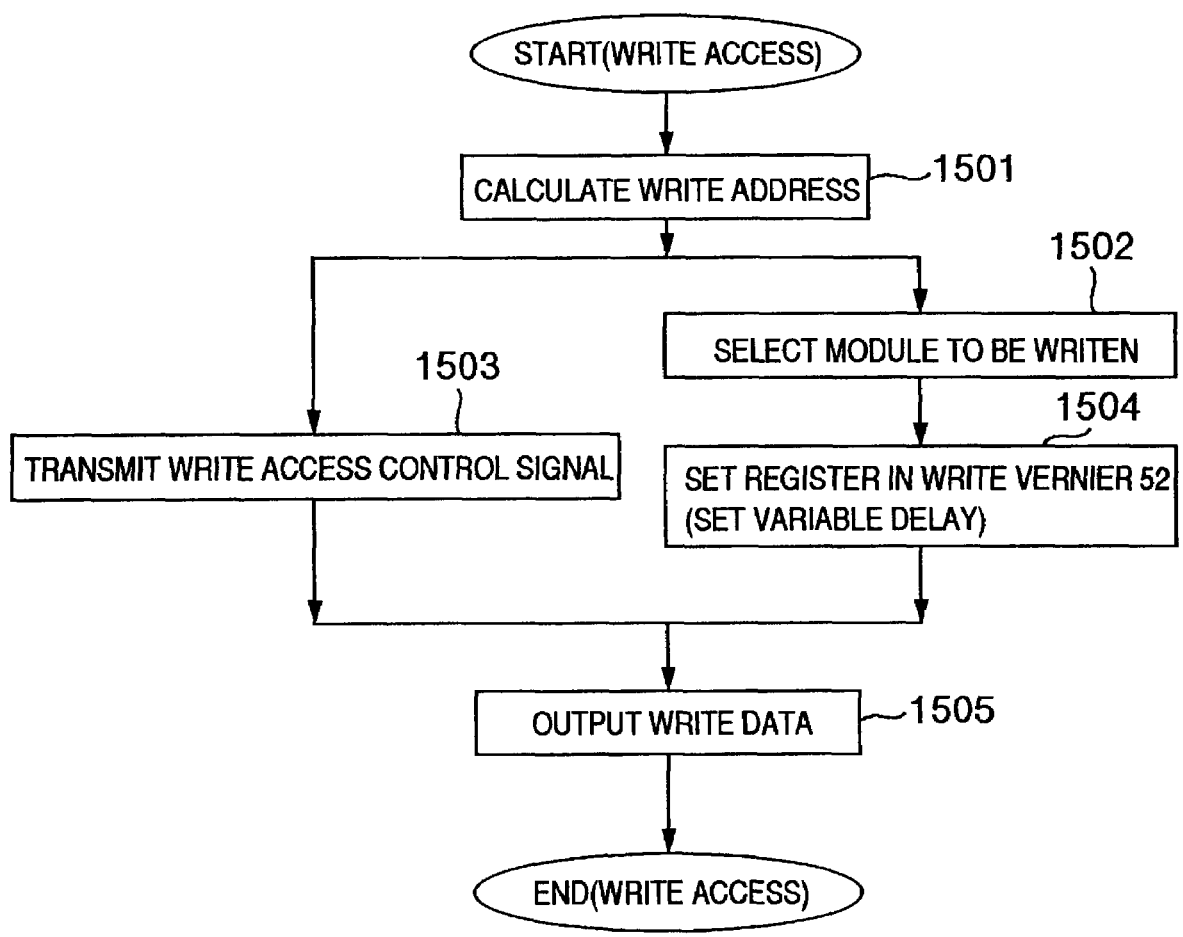
FIG. 13 is a flowchart of a write access sequence.

FIG. 13 shows a write access sequence.

In the case of a write access to the DRAM, the MC 1 preferentially accepts a write access request from the processor or I/O. In the MC 1, it is required to convert a logical address to an actual physical address of the DRAM, which is realized at a step 1501. At a next step 1502, a module corresponding to the computed physical address to be write-accessed is selected. The selected module is denoted by k. The module selection is carried out with use of the chip select (CS) signal. When the module selection is completed, the delay stage number of delay registers 71 is set for the write vernier 52 on the basis of the map of the delay register 71 of FIG. 12 (step 1504). Concurrently with the operations of the step 1502 and 1504, a write access control signal is sent to the memory (step 1503). The write access control signal is output from the MC 1 prior to the write data. Thereafter the write data properly delayed is output from the write vernier 52 (step 1505). At this stage, the write access has been completed. Of course, burst data write to contiguous addresses can be similarly carried out as in the step 1505.

Though the aforementioned sequence, the write data can be transmitted as synchronized reliably with the clock signal distributed to the modules.

Explanation will next be made as to a second embodiment with reference to FIG. 14.

Figure 14:
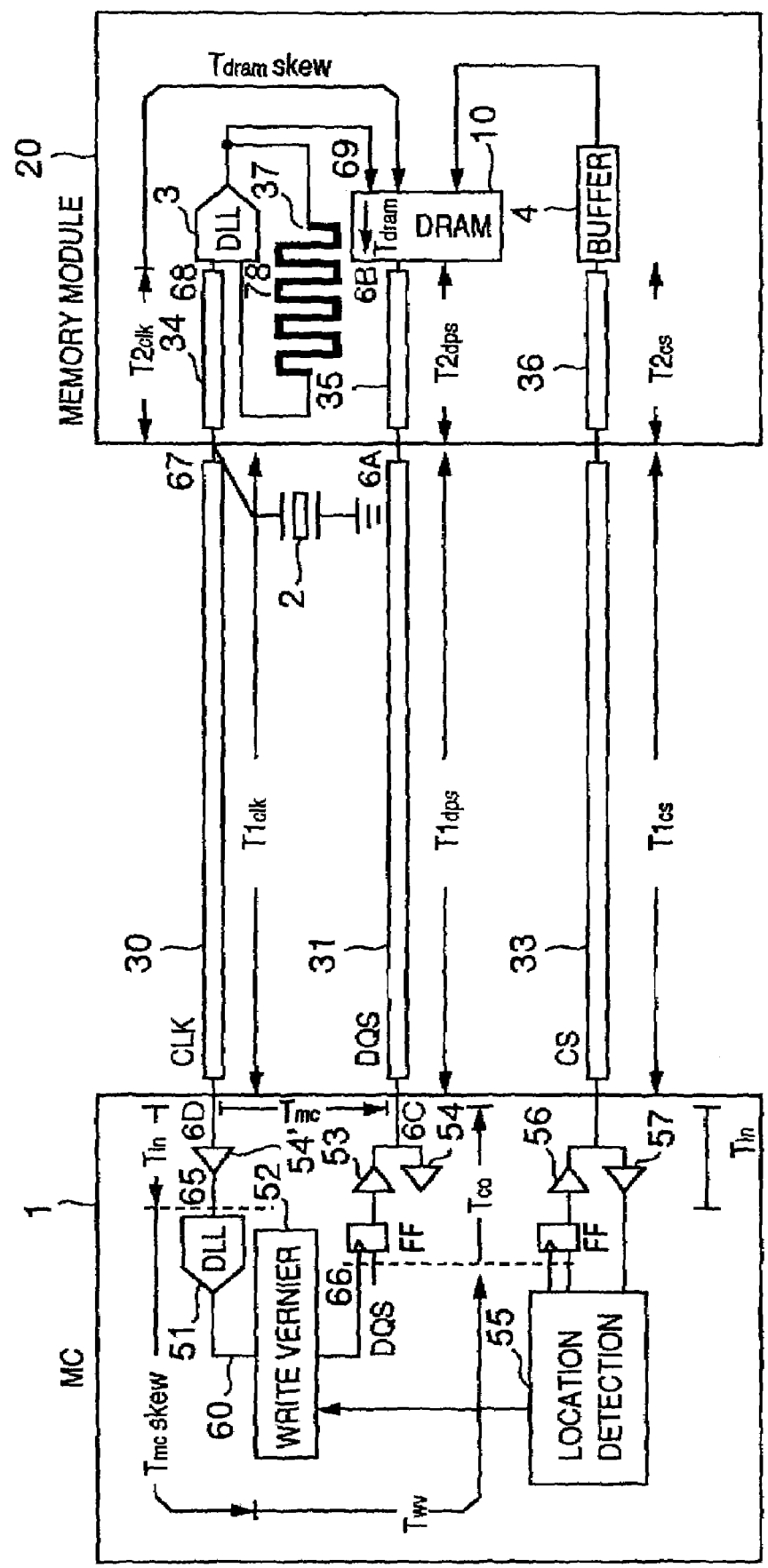
FIG. 14 is a diagram for explaining how to adjust write data timing.

FIGS. 14 and 10 are different in the timing of the clock generated and distributed by the clock stabilization circuit (DLL) 3 within the memory module 20. In FIG. 14, a signal obtained by delaying the output of the DLL 3 through a delay wired line 37 is applied to the DLL 3 as its reference.

Added in FIG. 14 are, in addition to the signals 65, 66 and 67 in FIG. 10, an input signal 68 of the DLL 3, a clock input signal 69 of the DRAM 10, a DQS signal 6A at a pin of the module 20, a DQS signal 6B at a pin of the DRAM 10 within the module 20, a DQS signal 6C at a pin of the MC 1, and a clock input signal 6D at a pin of the MC 1.

The delay wired line 37 has such a length that its delay amount corresponds to a sum of a wired line delay of the clock input signal 69 of the DRAM 10 from the clock output of the DLL 3 and twice of the propagation delay time T2 of the wired line 34. With such wiring, the clock of the DRAM 10 is advanced by T2 and becomes in phase with the signal 67. As a result, the time accuracy of the memory system can be further increased. The reason will be explained with reference to FIGS. 15A and 15B.

Figure 15A:
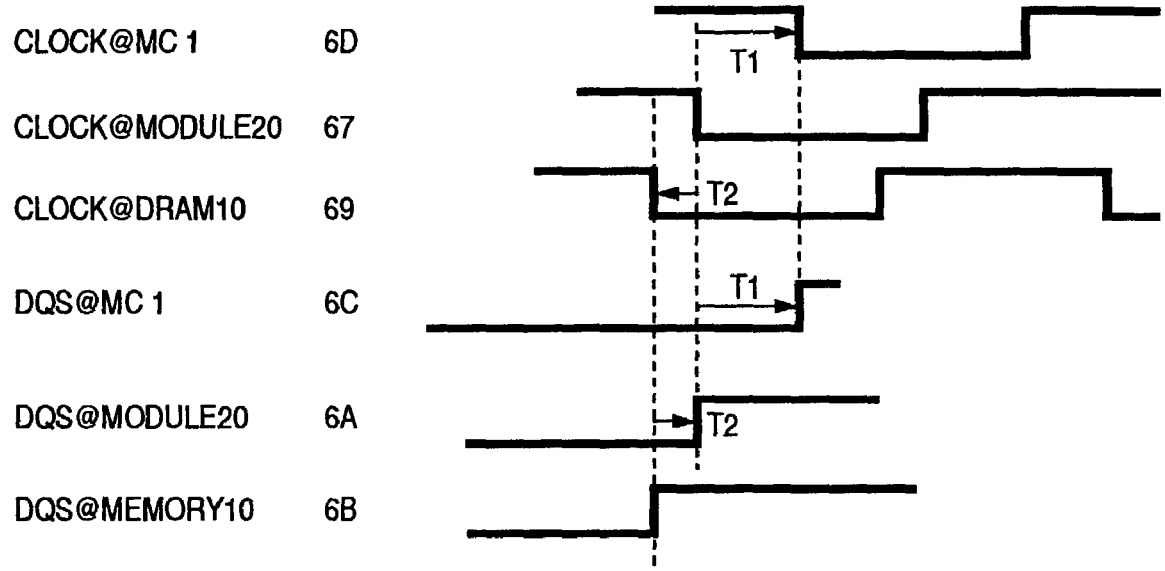
FIGS. 15A and 15B are diagrams for explaining timing of signals in a second embodiment.

FIG. 15A sows a timing chart of read data.

In FIG. 14, the clock signal first arrives at an input of the module 20 as the clock input signal 67, and also arrives at an input of the MC 1 as a signal 6D delayed by the propagation delay time T1 of the clock signal wired line 30. Further, the clock signal is input to the DRAM 10 faster by T2 than the signal 67 through the operation of the DLL 3.

The DRAM 10 outputs a data signal 6B having predetermined specifications according to the clock input signal 69. For simplicity, a time difference between the signals is assumed to be zero in FIGS. 15A and 15B. However, even when the time difference is not zero, the following description will hold true. A data signal issued from the DRAM 10 reaches an output of the buffer module 20 as the signal 6A after a delay time T2 of the wired line 35. Thereafter the data signal, after passage of the propagation delay time T1 of the wired line 31, reaches an input of the MC 1 as the DQS input signal 6C.

Figure 15B:
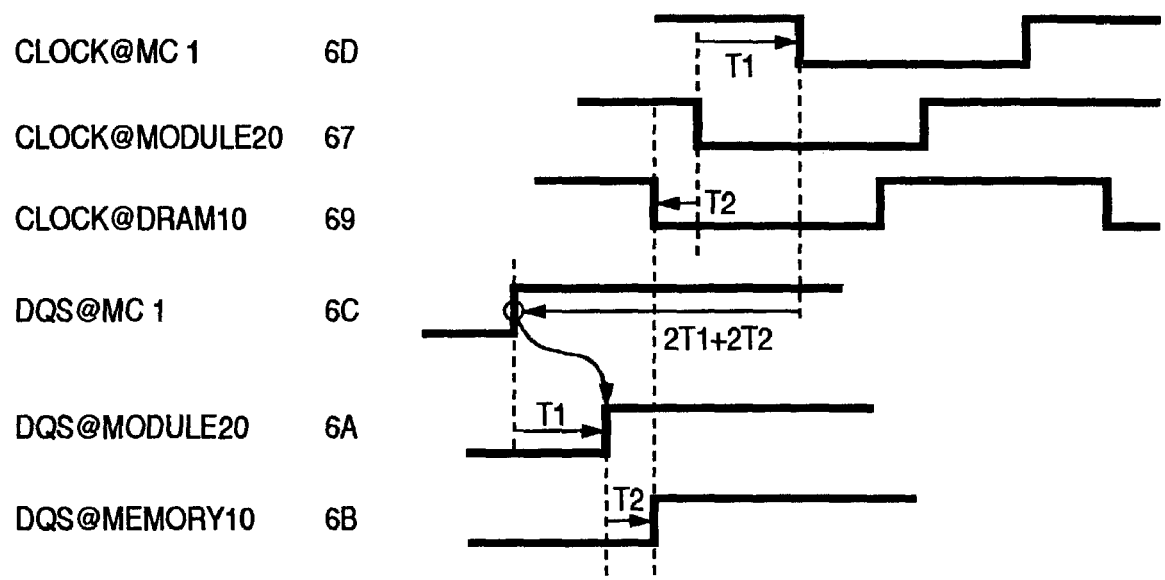

When viewed from the MC 1, the MC 1 receives the clock input signal 6D and the DQS signal 6C at exactly the same timing. In this way, the delay wired line 37 outputs a reference signal 78 delayed by a sum of twice of the time T2clk of the wired line 34 and the time Tskewdram. Thus the clock input signal 69 having an offset phase made faster by the sum than the clock input of the DLL is obtained, thus resulting in that the clock signal and data signal become in phase in the MC 1. As a result, so long as the lengths of the wired lines 34 and 35 within the module 20 are the same, the delay between the clock signal and data signal can be canceled. In the illustrated example, the DQS signal having a transition from its L level to H level is illustrated in FIGS. 15A and 15B, but the same holds true even for the opposite case. Similarly, it will be clear that, even when the DQS output signal 6B has a constant value with respect to the clock input signal 69 of the DRAM 10, the signal 6B arrives at the MC 1 with the value held.

Explanation will next be made as to timing of the write data by referring to FIG. 15B. The clock signals 60, 67 and 69 are the same as those in FIG. 15A.

It is after the delay time expressed by the Equation (11) that the DQS signal 66 is output from the MC 1. In this case, it is necessary for the write vernier 52 within the MC 1 to set the offset time 2*T2cs at zero, which is expressed by the following Equation.

$$Twv\ (65 \rightarrow 66) = Tdram - Tw \quad \text{(Equation 15)}$$
$$= Tdram - (Tin + 2^*T1 + 2^*T2 + Tco)$$

Where, it is assumed that the wired lines 34, 35 and 36 have substantially the same length T2. The Equation (15) is rewritten as follows, when being a delay time between the clock signal 6D and DQS signal 6C defined by pins of the MC 1.

$$Twv\ (6D \rightarrow 6C) = Twv\ (65 \rightarrow 66) + Tin + Tco \quad \text{(Equation 16)}$$
$$= Tdram - (2^*T1 + 2^*T2)$$

The relationship of the Equation (16) is illustrated by the DQS signal 6C in FIG. 15B. That is, the delay time of the MC 1 to the clock input signal 6D is 2*T1+2*T2. The DQS signal 66 is propagated along the wired line 31 and arrives at the input 6A of the module 20 after the time T1. And the DQS signal further arrives at the input 6B of the DRAM 10 after the time T2. The DQS signal 66 has exactly the same phase as the clock input signal 69. In other words, even for the write data, time adjustment can be realized only by providing a wired line difference to the DLL 3 and by the write vernier 52 of the MC 1 setting the offset at Tdram.

When the circuit is arranged as shown in FIG. 14, the clock signal and DQS signal can be made in phase with use of the specification of the DRAM 10 as an offset even for any of the read data and write data, thereby improving its time accuracy. Since the need for provision of a 2*T2 offset delay circuit in the write vernier 52 of the MC 1 is eliminated, the circuit arrangement can be made simple and its skew can be reduced. As a result, the system can be further increased in its operational speed.

Figure 16:
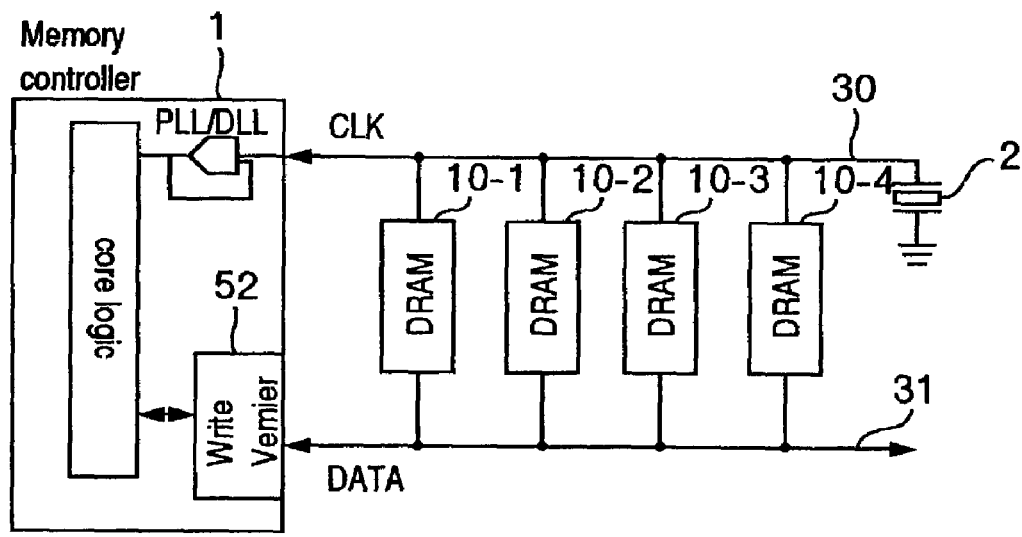
FIG. 16 shows a read priority wired memory system as a third embodiment of the present invention.

FIG. 16 shows a third embodiment.

FIG. 16 shows a memory system for direct access from the MC 1 to memories connected to the MC 1 via lines CLK and DATA. Memories 10-1 to 10-4 send and receive data directly to and from the MC 1 via the clock wired line 30 and data signal wired line 31. A clock pulse generator 2 is connected so that the wired lines 30 and 31 are preferentially wired. The MC 1 has a write vernier 52 to write data. Read data is taken in without any phase difference by the clock signal line 30. Explanation has been made as to the data transmission and reception between the MC 1 and memories 10-1 to 10-4. However, even when the memory system is of an LSI having another function, the time relationship remains without being changed and thus the same effects can be obtained.

Figure 17:
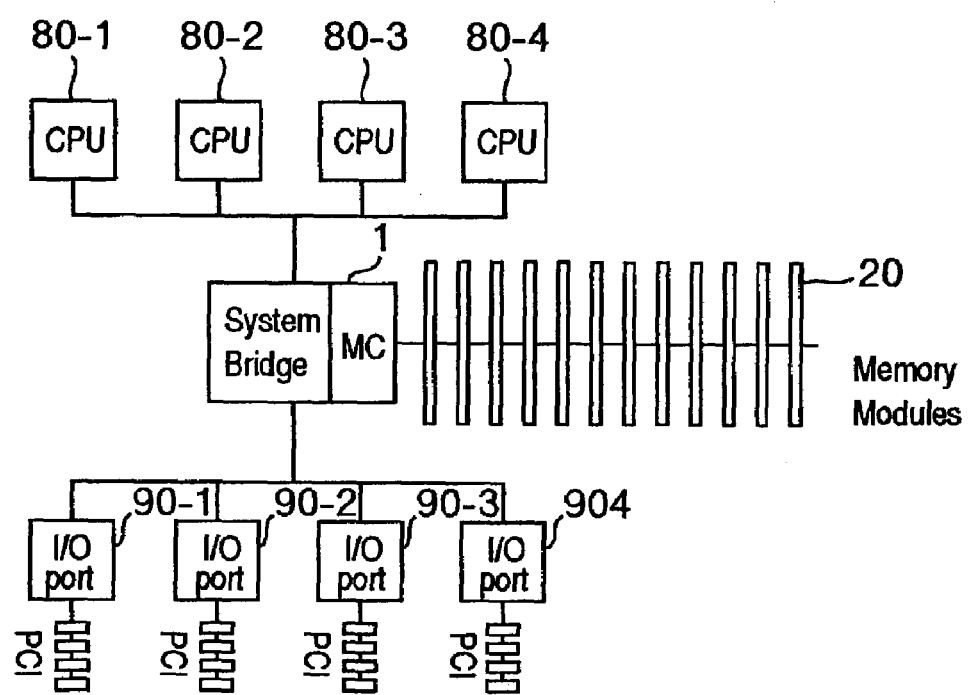
FIG. 17 shows an information processing apparatus using the read priority wired memory system.

FIG. 17 shows an embodiment wherein the present invention is applied to an information processing apparatus. The information processing apparatus includes processors 80-1 to 80-4, a memory module 20 having memories mounted therein and/or I/O ports 90-1 to 90-4. A system bridge controls data flow between the above components. A memory controller 1 incorporated in the system bridge controls the memory module 20 via a memory bus. When the technique already explained in the foregoing first to third embodiments is applied to the memory bus, the system can be improved in its read access latency and performance.

Next a fourth embodiment will be explained with reference to FIG. 18. In the drawing, ROM's 11-1 to 11-4 may be nonvolatile memories such as mask ROM's, programmable ROM's, flash ROM's, or ferroelectric nonvolatile RAM's.

Figure 18:
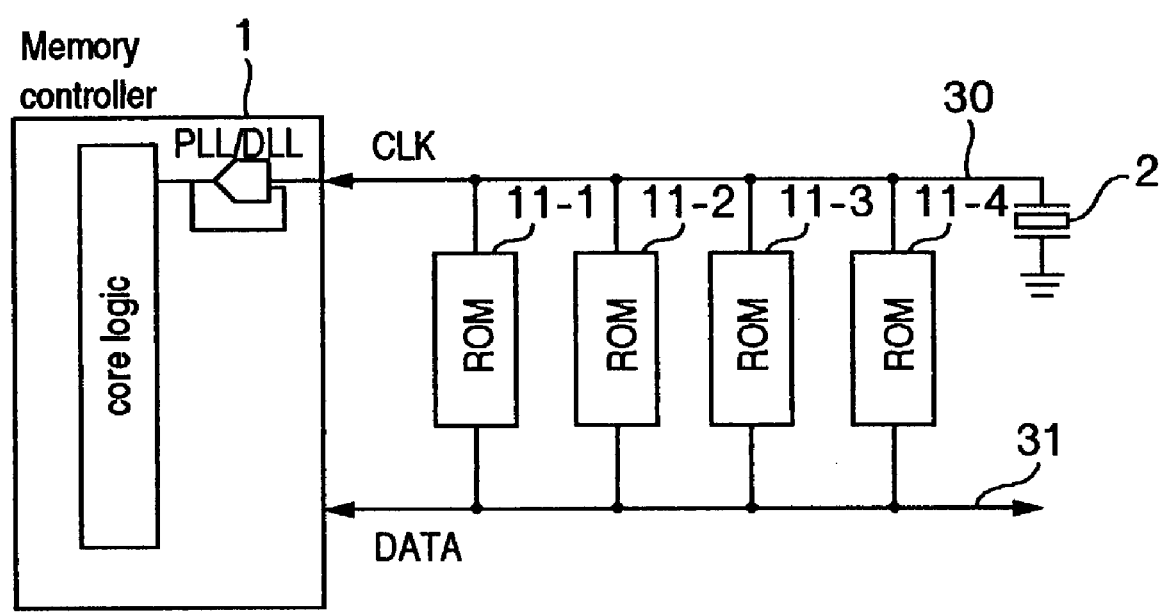
FIG. 18 shows a fourth embodiment of the present invention.

FIG. 18 shows a ROM system for performing read access to the ROM's 11-1 to 11-4 directly from the MC 1. The memories 11-1 to 11-4 transmit a read data signal 31 from the ROM's 11-1 to 11-4 to the MC 1 based on a clock signal on the clock wired line 30. Reference numeral 2 denotes a clock pulse generator. The wired lines 30 and 31 are wired with read access priority. With it, read data can be taken in without any phase difference as already mentioned so far, so long as the clock signal 30 is used. That is, data within the ROM's can be read out at a high speed.

In comparison with FIG. 16, the write vernier 52 to write data is not provided within the MC 1. This is because the vernier is not required for unwritable (unnecessary) ROM's or for ROM's such as flash ROM's where writing is possible but its writing speed is low. Such writing to the ROM's may be carried out by lowering the frequency of the clock generator 2. When the clock period is longer than the signal propagation delay time of the wired line 31, the write vernier is unnecessary.

FIG. 18 is directed to high-speed reading of the ROM's. In the system of FIG. 18 including the ROM's 11-1 to 11-4, MC 1 and clock generator 2, however, all or some of software required by the system are stored in the ROM's. For this reason, even when power shutdown takes place any time, the software within the ROM's will not be destroyed and the system can be stably restarted by turning the power ON. Further, data within the ROM's can be read out at a high speed, quick change-over between the application software stored in the ROM's can be advantageously realized on the system, e.g., from a moving-picture reproduction application to a voice compressing application. For this reason, the present invention can be suitably applied to specific application products such as home products based on Internet or portable information devices.

When the memory system is wired with a read access priority, the system can be shortened in its read access latency and be improved in its performance in an information processing apparatus wherein read access frequency is larger than write access frequency. Further, 1:1 wiring is provided between the memory controller (MC) and the plurality of memory modules, the rectangular pulse signal is driven along the wired line, and a returned time of the reflected wave of the signal is measured. Therefore, the propagation delay times to the modules can be known and write access can be done at a high speed with use of the known times even in the case of the read access priority wiring, the need for provision of the write vernier 52 in the memories can be eliminated, and only one clock signal pin is required to the package, thus lowering its cost.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A memory system comprising:

a memory controller;

a clock generator, connected to said memory controller through a first clock signal line, for propagating a clock signal along said first clock signal line toward said memory controller;

a plurality of second clock signal lines extended to be parallel and adjacent respectively to said first clock signal line, one end of said plurality of second clock signal lines being connected to terminating resistance respectively so that, when the clock signal is propagated along said first clock signal line, a crosstalk signal is propagated along said plurality of second clock signal lines in a direction opposite to the propagation direction of said clock signal;

a plurality of memory modules connected to the other ends of said plurality of second clock signal lines;

a data wired line which is provided for each of said plurality of memory modules and on which a data signal is transmitted between the corresponding memory module to which said data wired line is connected and said memory controller, said data wired line having substantially the same length as that of a portion of said first and second clock signal lines formed between said corresponding memory module and said memory controller; and a signal line which is provided for each of said plurality of memory modules and by which said corresponding memory module is connected to said memory controller, said signal line having substantially the same length as that of said data wired line;

wherein said memory controller comprises (i) a location detection circuit which transmits, prior to performing write access to said plurality of memory modules, a location detection signal to the memory module to which write access is performed through said signal line and receives a reflected signal from said memory module, thereby measuring a physical quantity corresponding to a signal propagation time between said memory module and said memory controller; and (ii) an adjustment circuit which controls timing, at which the data signal is transmitted from said memory controller to said memory module through said data wired line, according to the physical quantity so as to eliminate a phase difference in propagation delay times caused by the length of said data wired line.

2. A memory system comprising:

a memory controller;

a clock generator, connected to said memory controller, for propagating a clock signal on a clock signal line between said memory controller and said clock generator, one ends of said plurality of signal lines being connected to terminating resistances respectively so that. when the clock signal is propagated along said clock signal line, a crosstalk signal is propagated along said signal line in a direction opposite to the propagation direction of said clock signal; and a plurality of memory modules connected to the other ends of said plurality of signal lines;

wherein said memory controller comprises (i) a transmission circuit for transmitting, prior to write access to one of the memory modules, a location detection signal to said memory module, a reflected-signal detection circuit connected at its input to an output of said transmission circuit for measuring a physical quantity corresponding to a signal propagation time between said memory module and memory controller; and (ii) an adjustment circuit for controlling timing of transmission of the write data according to said physical quantity so as to eliminate a phase difference in propagation delay times caused by the length of the wired line to said memory module for write access to said memory module; and wherein said adjustment circuit controls the timing of transmission of the write data according to values obtained by calculating said physical quantity, propagation delay time corresponding to a distance between an input of a memory device in said memory module and a connection point between said memory module and said data wired line, and a required signal time between clock and data terminals prescribed by specifications of said memory device.

3. A memory system as set forth in claim 2, wherein said memory module has a clock stabilization circuit for accepting said clock signal and a reference signal and a memory device having a clock input terminal connected to said clock stabilization circuit, said memory device has a data terminal connected to said data wired line, an output of said clock stabilization circuit is again input thereto as said reference signal via a delay circuit providing a delay time determined by the specifications of said memory module.

4. A memory system as set forth in claim 3, wherein said adjustment circuit controls the timing of transmission of the write data according to values obtained by calculating said physical quantity and a required signal time between the clock and data terminals prescribed by the specifications of said memory device.

5. A memory system as set forth in claim 2, wherein said memory controller obtains a residue of an MOD operation over a value corresponding to a multiplication of said calculated values by 1 on the basis of a period TCK of an internal clock of said memory controller for said control of the write data transmission timing.

6. A memory system as set forth in claim 2, wherein said transmission circuit has substantially the same impedance as that of a signal path for transmission of said location detection signal to said memory module, and said reflected-signal detection circuit has a receiver having a hysteresis characteristic.

7. A memory system as set forth in claim 2, wherein said adjustment circuit controls timing of transmission of said write data by vertically connecting delay circuit elements corresponding in number to said physical quantity measured by said reflected-signal detection circuit.

* * * * *